United States Patent [19]

Kishida et al.

[11] Patent Number: 5,741,601
[45] Date of Patent: Apr. 21, 1998

[54] POLYAMIDE FILM AND PROCESS FOR PRODUCING THE SAME

[75] Inventors: Minoru Kishida; Masanobu Hioki; Junko Kobayashi, all of Kyoto, Japan

[73] Assignee: Unitika Ltd., Hyogo, Japan

[21] Appl. No.: 594,165

[22] Filed: Jan. 31, 1996

[51] Int. Cl.$^6$ .............................. B32B 27/06; C08J 11/00; B29C 55/00

[52] U.S. Cl. .................... 428/474.4; 428/475.5; 428/477.7; 428/910; 524/449; 524/606; 524/791; 524/789; 524/879; 264/176.1; 264/210.7; 264/235.8; 264/288.4; 264/290.2

[58] Field of Search .................. 428/474.4, 475.5, 428/477.7, 910; 524/449, 606, 791, 789, 879; 264/176.1, 210.7, 235.8, 288.4, 290.2

[56] References Cited

U.S. PATENT DOCUMENTS

| | | | |
|---|---|---|---|
| 4,098,860 | 7/1978 | Etou et al. | 264/171 |
| 5,414,042 | 5/1995 | Yasue et al. | 524/789 |

*Primary Examiner*—Leszek Kiliman
*Attorney, Agent, or Firm*—Sughrue, Mion, Zinn, Macpeak & Seas, PLLC

[57] ABSTRACT

A polyamide film having been drawn at a draw ratio of 2 or more in at least one direction, which comprises a polyamide resin composition comprising from 90 to 99.99% by weight of a polyamide and from 10 to 0.01% by weight of a fluoromica-based mineral with swelling characteristics. The film is excellent in piercing pinhole strength and mechanical strength and heat dimensional stability after a retort treatment.

8 Claims, No Drawings

POLYAMIDE FILM AND PROCESS FOR PRODUCING THE SAME

FIELD OF THE INVENTION

This invention relates to a polyamide film, which comprises a polyamide and a specific fluoromica-based mineral, excellent in strength, modulus of elasticity, dimensional stability, gas-barrier properties, piercing pinhole resistance, retort resistance, and slippage.

BACKGROUND OF THE INVENTION

Polyamide films are excellent in mechanical properties, dimensional stability, heat resistance, oil resistance, solvent resistance, optical properties, piercing pinhole resistance and gas-barrier properties and thus have been employed in packaging foods, medicines, miscellaneous goods, etc. In recent years, however, the application range of polyamide films has been broadened and the conventional polyamide films sometimes fail to satisfy the requirements. It is therefore required to further improve each of the properties of polyamide films. For example, polyamide films have been used in packaging retort pouch foods by taking advantage of the high toughness. However, such a film does not have sufficient dimensional stability against a retort treatment at a high temperature (about 130° C.) and largely shrinks and expands, which lowers the commercial value of the product. Recently, attempts have been made to elevate the retort treating temperature and shorten the treating time to thereby improve the productivity. Thus, there have been employed laminate film bags composed of a heat-stable polyester film as the external layer and a tough polyamide film as the inner layer. However, there arises a problem that the production of these bags costs a great deal. In addition, when such a polyamide film is used in packaging marine products (for example, abalone, turban shell, lobster, crab) or cereals (for example, rice, bean), it shows only an insufficient strength during transportation. Thus, it is required to further improve the performance thereof.

To solve these problems, JP-A-2-105856 corresponding to U.S. Pat. No. 5,248,720 (the term "JP-A" as used herein means an "unexamined published Japanese patent application") discloses a film comprising a polyamide and a layered silicate. In the case of this film, however, a pretreatment step is required for enlarging the interlayer distance by preliminarily contacting the layered silicate with a swelling agent so as to ensure the homogeneous dispersion of the layered silicate in the polyamide, which also brings about an increase in production cost. From the viewpoint of the properties, moreover, this film is unsatisfactory in piercing pinhole resistance and retort resistance. It is also disclosed that a resin composition comprising a polyamide with a fluoromica-based mineral with swelling characteristics has excellent mechanical strength and dimensional stability (JP-A-6-248176 corresponding to U.S. Pat. No. 5,414,042).

SUMMARY OF THE INVENTION

The present invention aims at solving the above-mentioned problems. Namely, an object of the present invention is to provide a film suitable as a packaging material which has improved strength, modulus of elasticity, dimensional stability (dry heat, wet heat), gas-barrier properties, retort resistance, piercing pinhole resistance and slippage while sustaining the excellent properties of polyamide films.

In order to achieve the above object, the present inventors have conducted extensive studies. As a result, they have successfully found that a drawn polyamide film comprising a polyamide and a fluoromica-based mineral with swelling characteristics has excellent properties, thus completing the present invention.

That is, the gist of the present invention resides in the following points.

(1) A polyamide film having been drawn at a draw ratio of 2 or more in at least one direction, which comprises a polyamide resin composition comprising from 90 to 99.99% by weight of a polyamide and from 10 to 0.01% by weight of a fluoromica-based mineral with swelling characteristics.

(2) A polyamide film as described in the above (1), wherein said polyamide resin composition is obtained by polymerizing a monomer capable of forming the polyamide in the presence of a fluoromica-based mineral with swelling characteristics.

DETAILED DESCRIPTION OF THE INVENTION

The polyamide used in the present invention means a polymer having amide bonds in the main chain formed by the reaction of amino acid; lactam; or diamine with dicarboxylic acid. The amino acid is an intermediate compound which can be obtained by hydrolysis of lactam. The polyamide is also prepared by using the amino acid as a starting material.

Examples of monomers capable of forming such polyamides are as follows.

As amino acids, 6-amino caproic acid, 11-amino undecanoic acid, 12-amino dodecanoic acid and p-aminomethylbenzoic acid are exemplary.

As lactams, ε-caprolactam and ω-laurolactam are exemplary.

As diamines, tetramethylenediamine, hexamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, m-xylylenediamine, p-xylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis(aminopropyl)piperazine and aminoethylpiperazine are exemplary.

As dicarboxylic acids, adipic acid, suberic acid, azelaic acid, sebacic acid, dodecanoic diacid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid, hexahydroisophthalic acid and diglycolic acid are exemplary.

Preferable examples of the polyamide to be used in the present invention include nylon 6, nylon 46, nylon 66, nylon 69, nylon 610, nylon 612, nylon 611, nylon 11, nylon 12, nylon 6I, nylon 6/66, nylon 6T/6I, nylon 66/6T, polybis(4-aminocyclohexyl)methanedodecamide (nylon PACM12), polybis(3-methyl-4-aminocyclohexyl)methanedodecamide (nylon dimethyl PACM12), polymethaxylilene adipamide (nylon MXD6), polyundecamethylene terephthalamide (nylon 11T) and polyundecamethylene hexahydroterephthalamide [nylon 11T(H)], wherein I represents an isophthalic acid component while T represents a terephthalic acid component. A mixed polyamide of two or more of these materials and copolymers thereof are also usable.

Among these polyamides, it is particularly preferable to use nylon 6, nylon 46, nylon 66, nylon 11, nylon 12, nylon 610 and copolymers and mixtures thereof. Nylon 6 may be cited as the most desirable one.

These polyamides may be copolymerized with other copolymerizable components, if required.

The polyamide used herein can be produced by the well known melt-polymerization method (cf. JP-A-55-151032) which can be optionally followed by the well known solid-phase polymerization method (cf. British Patent No. 798659 (1958)). Although the relative viscosity of the polyamide used in the present invention is not particularly restricted, it is preferable that the polyamide have a relative viscosity falling within a range of from 1.5 to 5.0, determined at a temperature of 25° C. and at a concentration of 1 g/dl with the use of phenol/tetrachloroethane (60/40, by weight) as a solvent. A relative viscosity lower than 1.5 is not preferable since the mechanical performance of the film is deteriorated in this case. On the other hand, a relative viscosity exceeding 5.0 is also not preferable, since the film-forming properties deteriorate in this case.

The fluoromica-based mineral with swelling characteristics prepared by the above-mentioned method has a structure represented by the following general formula (1).

$$\alpha(MF).\beta(aMgF_2.bMgO).\gamma SiO_2 \quad (1)$$

(wherein M represents sodium or lithium; and $\alpha$, $\beta$, $\gamma$, a and b each represent a coefficient provided that $0.1 \leq \alpha \leq 2$, $2 \leq \beta \leq 3.5$, $3 \leq \gamma \leq 4$, $0 \leq a \leq 1$, $0 \leq b \leq 1$ and $a+b=1$.)

Such a fluoromica-based mineral may be prepared, for example, by a so-called melt method (cf. N. Daimon, J. Chem. Soc. Japan, Ind. Chem. Soc., 55, 694 (1952)) which comprises mixing an oxide (for example, silicon oxide, magnesium oxide, aluminum oxide) with various fluorides, completely melting the resulting mixture in an electric oven or a gas oven at a temperature of from 1,400° to 1,500° C., and making the crystals of the fluoromica-based mineral to develop in the reactor during the cooling process.

JP-A-2-149415 discloses another method wherein talc is employed as a starting material and subjected to intercalation with an alkali ion to thereby give a fluoromica-based mineral. According to this method, talc is mixed with an alkali silicofluoride or an alkali fluoride and heated to 700° to 1,200° C. in a porcelain crucible for a short period of time to thereby give fluoromica.

In the intercalation method, for example, it is preferable to control the amount of the alkali silicofluoride or alkali fluoride to be mixed with talc to 10 to 35% by weight based on the weight mixture. An amount thereof outside this range causes a decrease in the yield of the fluoromica-based mineral with swelling characteristics.

In order to obtain the fluoromica-based mineral with swelling characteristics, it is necessary to use sodium or lithium, among the alkali metals, as the metals constituting the silicofluoride(s) or fluoride(s). These alkali metals may be used either single or in combination. Potassium, among the alkali metals, is not preferably used herein, since a fluoromica-based mineral with swelling characteristics cannot be obtained using potassium. However, potassium may be used in a limited amount (less than ⅓ of sodium and/or lithium by weight) together with sodium or lithium in order to control swelling characteristics. The content of the sodium and/or lithium silicofluoride(s) and/or fluoride(s) to be mixed with the talc preferably falls within a range of from 10 to 35% by weight based on the total mixture weight; an amount outside this range causes a decrease in the yield of the fluoromica-based mineral with swelling characteristics.

In one process for preparing the fluoromica-based mineral with swelling characteristics used in the present invention, a small amount (less than 20% by weight based on talc) of alumina ($Al_2O_3$; size: 0.01–10 μm) may be added so as to control the swelling characteristics of the resulting fluoromica-based mineral with swelling characteristics.

The term "swelling characteristics" as used herein means such properties that the fluoromica-based mineral absorbs polar molecules such as amino acids, nylon salts or water molecules or cations among its layers and thus the interlayer distance is enlarged or the fluoromica-based mineral undergoes further swelling or cleavage to thereby give ultrafine particles. The fluoromica-based mineral represented by the above formula (1) exhibits such swelling characteristics. When analyzed by the X-ray powder method, the fluoromica-based mineral with swelling characteristics used in the present invention has a basal spacing along the C-axis of 9 to 20 Å.

The swelling characteristics can be evaluated by measuring the basal spacing of silicate layers in the fluoromica-based mineral by the use of X-ray. For example, 100 g of a fluoromica-based mineral is mixed with 10 l of 0.025N hydrochloric acid aqueous solution at room temperature, and 35 g of aminocapronic acid is added to the mixture, followed by stirring for 10 minutes. By this procedure, proton-added aminocapronic acid molecules are intercalated into silicate layers, and a swollen fluoromica-based mineral is obtained. An increase in basal spacing of silicate layers after this treatment can be taken as an index for the swelling characteristics.

The term "nylon salt" is a generic term representing a salt which is produced by a reaction of equimolar amounts of dicarboxylic acid and diamine. By polycondensation, the nylon salt becomes polyamide. Examples of nylon salts include 6-6 salts, 4-6 salts, and 6-10 salts.

The content of the fluoromica-based mineral with swelling characteristics ranges from 10 to 0.01% by weight compared to 90 to 99.9% by weight of the polyamide or monomer capable of forming 100 parts by weight of the polyamide (i.e., the fluoromica-based mineral with swelling characteristics: the polyamide=0.01:99.9 to 10:90). When this content is less than 0.01% by weight, only poor effects of the present invention can be achieved. It is not preferable, on the other hand, that the content exceed 10% by weight, since the toughness is deteriorated in this case.

The amount of monomer required to form 100 parts by weight of the polyamide is determined based on the kind of monomer. When lactam is used as monomer, 100 parts by weight of the monomer forms 100 parts by weight of polyamide. When amino acid or diamine and dicarboxylic acid is used as monomer, the amount of monomer is determined by taking into consideration the weight loss due to the polycondensation reaction to form the polyamide accompanies by dehydration.

The composition of the present invention may be produced by any of the publicly known methods. For example, the polyamide and the fluoromica-based mineral with swelling characteristics may be kneaded together in a molten state with the use of an extruder.

The most desirable production method is the process wherein a monomer, which is capable of forming a polyamide, is polymerized in the presence of a definite amount of a fluoromica-based mineral with swelling characteristics. In this case, the fluoromica-based mineral with swelling characteristics is sufficiently and finely dispersed in the polyamide and thus the object of the present invention can be completely achieved.

In the film described in JP-A-2-105856 corresponding to U.S. Pat. No. 5,248,720 which comprises a polyamide and a layered silicate, it is required to effect a pre-treatment by preliminarily contacting the layered silicate with a swelling agent to enlarge the interlayer distance in order to give a composition wherein the layered silicate is homogeneously dispersed in the polyamide. In contrast, it is surprising that the resin composition of the present invention can be produced without effecting any pre-treatment but merely by polymerizing a monomer in the presence of a fluoromica-based mineral with swelling characteristics.

In addition, it is a surprising fact that a film obtained according to the present invention are extremely excellent in film properties such as mechanical properties, retort resistance, and the like, in comparison with the film obtain from the resin composition produced by the process disclosed in JP-A-2-105856.

The polyamide resin composition, which is to be used as the starting material for the production of the film of the present invention, may further contain various additives (for example, pigments, heat stabilizers, antioxidants, weathering agents, flame-retardants, plasticizers, mold release agents, and other reinforcing agents), so long as the characteristics thereof are not seriously degraded thereby. As the heat stabilizers and the antioxidants, for example, hindered phenols, phosphorus compounds, hindered amines, sulfur compounds, copper compounds, alkali metal halides and mixtures thereof are usable. In general, these additives (for example, heat stabilizers, antioxidants, weathering agents) are added in the melt-extruding or polymerization step.

It is also possible to add various inorganic or organic lubricants thereto so as to improve the slippage of the film. Examples of the lubricants include clay, talc, calcium carbonate, zinc carbonate, wallastonite, silica, alumina, magnesium oxide, calcium silicate, asbestos, sodium aluminate, calcium aluminate, sodium aluminosilicate, magnesium silicate, glass balloons, carbon black, zinc oxide, antimony trioxide, zeolite and hydrotalcite.

The amount of these additives may arbitrarily be decided so long as the effects of the present invention are not deteriorated. For example, these additives may be used in a few percentage (e.g., 3% by weight) or less based on the total weight.

The polyamide resin composition of the present invention, which is to be used as the starting material for the production of the film of the present invention, may further contain other polymers, so long as the characteristics thereof are not seriously degraded thereby. Examples of these polymers include polybutadiene, butadiene-styrene copolymer, acrylic rubber, ethylene-propylene copolymer, ethylene-propylene-diene copolymer, natural rubber, chlorinated butyl rubber, chlorinated polyethylene and elastomers prepared by modifying the same with maleic anhydride, etc., polyethylene, polypropylene, polyethylene terephthalate and polybutylene terephthalate.

The resin composition of the present invention can be used either as an undrawn film or a drawn film.

The drawn film of the present invention may be produced by a publicly known method such as the tubular method (cf. JP-B-46-15439; the term "JP-B" as used herein means an "examined Japanese patent publication") or the T-die method (cf. JP-B-59-36854 and U.S. Pat. No. 3,502,766).

For example, the drawn film of the present invention can be obtained by, for example, the T-die method of the flat film formation in the following manner, Namely, the resin composition is fed into an extruder, molten therein by heating, extruded in the form of a sheet from the die orifice of the T-die and then wound around a cooling drum to thereby give an undrawn film. After regulating the moisture content thereof to less than 1.3% by weight, the undrawn film is serially drawn biaxially (stretching into two directions through two steps). Alternatively, the moisture content is regulated to 1.3 to 10% by weight and the undrawn film is simultaneously drawn biaxially. The moisture content may be measured by the Carl Fisher method (cf. ASTM E203-75).

By the tubular method, the resin composition is extruded from a circular die and the resulting tube is cooled with an air stream or water to thereby give an undrawn film. After regulating the moisture content thereof to less than 1.3% by weight, air-pressure, etc. is pressed into the tube which is then simultaneously drawn biaxially.

If required, the surface of the film thus obtained may be subjected to physicochemical surface treatments (for example, corona discharge, surface hardening treatment, electroplating, cleaning, coloring, painting, coating). The film of the present invention may be employed either as a single layer film or as a laminated film together with other materials.

The film of the present invention is excellent in slippage, since microprotrusions having the fluoromica-based mineral with swelling characteristics as a core are formed on the surface thereof. Also, the fluoromica-based mineral with swelling characteristics is dispersed in the polyamide in the form of ultrafine particles. Accordingly, the film of the present invention can sustain a high transparency and is highly resistant against flex fatigue resistance, even though the fluoromica-based mineral with swelling characteristics is added at a relatively high concentration.

The fluoromica-based mineral with swelling characteristics serves as a highly effective crystal nucleating agent for the polyamide and thus contributes to the improvement in modulus of elasticity, dry heat and wet heat dimensional stabilities, gas-barrier properties and retort resistance.

To further illustrate the present invention in greater detail, the following Examples will be given.

The materials and measuring methods employed in the evaluation given in these Examples and Comparative Examples are as follows.

1. Materials

1) Fluoromica-based mineral

Talc was powdered in a ball mill in such a manner as to give an average particle size of 2 μm and then mixed with the silicofluorides, fluoride or alumina as listed in Table 1 having the same average particle size of 2 μm in an amount of shown in Table 1 (parts by weight) based on the total mixture. The thus obtained mixture was then fed into a porcelain crucible and kept in an electric oven at 800° C. for 1 hour, in a nitrogen atmosphere. Thus, fluoromica-based minerals M-1 to M-3 were obtained. When the fluoromica-based minerals thus formed were analyzed by the X-ray powder method, M-1 to M-3 showed no peak assignable to the basal spacing of 9.2 Å along the C-axis of talc but peaks at 12 to 16 Å, reflecting that fluoromica-based minerals with swelling characteristics had been formed.

TABLE 1

| Fluoromica-based mineral with swelling characteristics | | M-1 | M-2 | M-3 |
|---|---|---|---|---|
| Composition | talc | 80 | 80 | 80 |
| | Sodium silicofluoride | 20 | | 12 |
| | Lithium silicofluoride | | 20 | |
| | alumina | | | 8 |

Note:
The components are substantially represented by the formulae:
Talc: $Mg_3SiO_{10}(OH)_2$
Sodium Silicofluoride: $Na_2SiF_6$
Lithium Silicofluoride: $Li_2SiF_6$
Alumina: $Al_2O_3$ 2) Smectite A product of Co-op Chemical Co., Ltd. (SWN).

3) Non-swelling mica:

A product of Co-op Chemical Co., Ltd. (MK-110) represented by the formula (1) wherein M is potassium.

4) Montmorillonite

Natural montmorillonite produced in the Yamagata prefecture, Japan.

5) Kaolin

A product of Hayashi Kasei K.K.

6) Silica

A product of Mizusawa Kagaku K.K.

2. Measurement methods (1) Haze (Hz)

As an indication of transparency, the haze of a film (thickness: 15 μm) was measured with a haze meter (manufactured by Tokyo Denshoku K.K.) in accordance with ASTM D1003-61.

(2) Flex fatigue resistance (pinholes after bending)

A rectangular film (20.3 mm×27.9 mm), which had been moisture-conditioned at 20° C. under 65% RH, was set to a gelbo flex tester (manufactured by Rigaku Kogaku K.K.). Then, it was turned by 440° while advancing straight for 8.9 mm. After advancing straight for additional 6.4 mm, it was returned to the original position vice versa. This operation was counted as a single flexing movement and repeated 10,000 times.

After the completion of the flexing test, a coloring solution (Ageless Seal Check manufactured by Mitsubishi Gas Chemical Co., Inc.) was applied onto one face of the film. Then, the spots where the coloring solution soaked onto the opposite face were counted as pinholes (measured area: 497 $mm^2$).

(3) Dry heat shrinkage percentage

Rectangular sample pieces were cut from a film having bench marks in the major direction (MD) and the transverse direction (TD). After treating in an oven at 160° C. for 5 minutes, the intervals among the bench marks were measured at 20° C. under 65% RH (equilibrated). The shrinkage due to the treatment was expressed in percentage based on the dimension of the untreated sample.

(4) Tensile strength and elongation at break

Measurement was carried out by using an Autograph Model DSS-500 (manufactured by Shimadzu Corporation) in accordance with ASTM D882. The data were expressed in averages in the MD and TD.

(5) Piercing pinhole resistance

A sample film was fixed under tension to a circular frame (inner diameter: 100 mm). Then, the center of this sample was vertically pierced with a needle (curvature radius: 0.5 mm) at a rate of 50 mm/min. Thus, the strength at the breakage of the film was measured. The measurement was made at the center of the film which had been drawn and wound.

(6) Static coefficient of friction

Measurement was carried out by using an Autograph Model DSS-500 (manufactured by Shimadzu Corporation) in accordance with ASTM D1894.

(7) Three-dimensional surface roughness

SRa and SRz were measured by using a surface roughness meter Model SE-3AK (manufactured by Kosaka Kenkyusho) in accordance with JIS B-0601-1976 (feeler diameter: 2 μm R, feeler pressure: 10 mg, height: 5000-fold).

(8) Retort resistance

By using a 5 l pressure container, a film was soaked in hot water at 130° C. After treating for 30 minutes, the dimensional change and mechanical properties were evaluated.

(9) Gas-barrier properties (oxygen permeability)

Measurement was carried by using a MOCON OX-TRAN 100A (manufactured by Modern Control) in accordance with ASTM D-3985-81 (23° C., 100% RH).

EXAMPLES 1 to 5

10 kg of ε-caprolactam was blended with 2 kg of water and M-1, M-2 or M-3 each in the amount as specified in Table 2. The mixture thus obtained was fed into a 30 l reaction tank and the ε-caprolactam was polymerized.

The polymerization was carried out in the following manner. That is, the blend was heated to 250° C. while stirring until the internal pressure was elevated from 4 $kg/cm^2$ to 15 $kg/cm^2$. After reducing the pressure to 2 $kg/cm^2$, the polymerization was carried out at 260° C. for 3 hours. Upon completion of the polymerization, the polymer was taken out from the reaction tank and cut into pellets.

The nylon 6 pellets thus obtained were refined by treating with hot water at 95° C. After drying, the pellets were fed into an extruder and molten by heating to 260° C. Then, the molten matter was extruded from the die orifice of the T-die to form a film by the flat film formation method and cooled by winding around a drum having a surface temperature of 10° C. Thus, an undrawn film having a thickness of 150 μm was prepared.

Next, the film was soaked in a warm water tank (50° C.) for 2 minutes (water absorption ratio: 2.8% by weight), and simultaneously drawn biaxially at 175° C. (at draw ratios of 3 in the longitudinal direction and 3.3 in the transverse direction) followed by relaxation at 5%. Then, it was subjected to heat treated at 210° C. for 7 seconds to thereby give a drawn film having a thickness of 15 μm.

The properties of the drawn films thus obtained were evaluated. Table 2 shows the results.

TABLE 2

| Item | | Ex. 1 | Ex. 2 | Ex. 3 | Ex. 4 | Ex. 5 |
|---|---|---|---|---|---|---|
| Polyamide | | Nylon 6 | Nylon 6 | Nylon 6 | Nylon 6 | Nylon 6 |
| Component blended | | M-1 | M-1 | M-1 | M-2 | M-3 |
| Amount of component blended (wt. %) | | 0.1 | 2.0 | 7.0 | 2.0 | 2.0 |
| Tensile strength MD/TD ($kg/mm^2$) | | 18/25 | 24/30 | 20/23 | 25/29 | 24/28 |
| Breaking extension (%) | | 75/80 | 120/90 | 70/64 | 125/96 | 115/85 |
| Oxygen permeability ($cc/m^2 \cdot 24$ hr) | | 34 | 21 | 16 | 24 | 25 |
| Dry heat shrinkage percentage MD/TD(%) | | 1.1/0.9 | 0.9/0.4 | 0.6/0.4 | 0.4/0.4 | 0.4/0.4 |
| Hz (%) | | 3 | 5 | 9 | 4 | 6 |
| Piercing pinhole resistance (kg/mm) | | 70 | 80 | 83 | 75 | 78 |
| Flex fatigue resistance | | 0 | 0 | 3 | 0 | 0 |
| Static coefficient of friction | | 0.70 | 0.5 | 0.4 | 0.45 | 0.55 |
| Roughness: | SRa (μm) | 0.014 | 0.015 | 0.26 | 0.14 | 0.16 |
| | SRz (μm) | 0.4 | 0.55 | 2.2 | 0.6 | 0.62 |
| After retort treatment: | Shrinkage MD/TD (%) | 1.4/1.6 | 0.9/1.2 | 0.9/0.8 | 0.8/1.2 | 0.8/1.2 |
| | Tensile strength MD/TD ($kg/mm^2$) | 18/21 | 26/24 | 21/24 | 25/25 | 25/26 |
| | Breaking extension MD/TD (%) | 74/68 | 90/122 | 85/70 | 94/114 | 92/120 |

COMPARATIVE EXAMPLES 1 TO 6

The procedure of Example 1 was repeated but except that smectite, non-swelling mica, montmorillonite, kaolin or silica, each in the amount as defined in Table 3 was used instead of M-1 to M-3. As a result, drawn films having a thickness of 15 µm were obtained.

The properties of the drawn films thus obtained were evaluated. Table 3 shows the results.

TABLE 3

| Item | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Polyamide | | Nylon 6 | Nylon 6 | Nylon 6 | Nylon 6 | Nylon 6 | Nylon 6 |
| Component blended | | — | SWN | MK-110 | 1) | Kaoline | Silica |
| Amount of component blended (wt. %) | | — | 2 | 2 | 2 | 2 | 2 |
| Tensile strength MD/TD (kg/mm$^2$) | | 13/24 | 23/27 | 24/26 | 22/24 | 23/23 | 22/23 |
| Breaking extension (%) | | 40/60 | 90/70 | 95/80 | 85/60 | 90/85 | 83/80 |
| Oxygen permeability (cc/m$^2$ · 24 hr) | | 55 | 24 | 27 | 30 | 39 | 30 |
| Dry heat shrinkage percentage MD/TD(%) | | 1.7/1.4 | 1.3/1.1 | 1.7/1.4 | 1.3/1.1 | 1.7/1.1 | 1.7/1.2 |
| Hz (%) | | 4 | 4 | 5 | 6 | 7 | 9 |
| Piercing pinhole resistance (kg/mm) | | 60 | 63 | 50 | 60 | 40 | 43 |
| Flex fatigue resistance | | 0 | 0 | 8 | 3 | 10 | 9 |
| Static coefficient of friction | | 0.75 | 0.95 | 0.73 | 0.91 | 0.7 | 0.71 |
| Roughness: | SRa (µm) | 0.016 | 0.001 | 0.015 | 0.002 | 0.013 | 0.015 |
| | SRz (µm) | 0.992 | 0.25 | 0.95 | 0.3 | 0.87 | 0.42 |
| After retort treatment: | Shrinkage MD/TD (%) | 4.4/6.0 | 3.5/4.0 | 3.8/4.2 | 3.5/3.3 | 3.0/4.8 | 3.7/4.6 |
| | Tensile strength MD/TD (kg/mm$^2$) | 9/15 | 13/20 | 9/12 | 8/9 | 9/10 | 8/9 |
| | Breaking extension MD/TD (%) | 35/40 | 60/51 | 12/19 | 13/20 | 12/18 | 11/13 |

1)Montmorillonite

EXAMPLE 6

10 kg of nylon 66 salt was blended with 3 kg of water and M-1 in the amount as specified in Table 4. The resulting mixture was fed into a 30 l reaction tank and the nylon 66 salt was polymerized.

The polymerization was carried out in the following manner. That is, the mixture was stirred at 230° C. and heated until the internal pressure reached 18 kg/cm$^2$. After reaching this pressure level, the same pressure was maintained by heating while slowly discharging steam. When the temperature reached to 280° C., the pressure was reduced to the normal pressure and the polymerization was carried out for additional 2 hours. After the completion of the polymerization, the nylon 66 was taken out and cut into pellets.

The nylon 66 pellets thus obtained were dried, fed into an extruder and molten by heating to 280° C. Then, the molten matter was extruded from the die orifice of the T-die to form a sheet by the flat film formation method and cooled by winding around a drum having a surface temperature of 10° C. Thus, an undrawn film having a thickness of 150 µm was prepared.

Next, the film was soaked in a warm water tank (50° C.) for 2 minutes (water absorption ratio: 2.7% by weight) and simultaneously drawn biaxially at 180° C. (at draw ratios of 3 in the longitudinal direction and 3.3 in the transverse direction), followed by relaxation at 5%. Then, it was subjected to heat treatment at 220° C. to thereby give a drawn film having a thickness of 15 µm.

The properties of the drawn films thus obtained were evaluated. Table 4 shows the results.

COMPARATIVE EXAMPLE 7

The procedure of Example 6 was repeated except that smectite in the amount as defined in Table 4 was used instead of M-1. As a result, a drawn film having a thickness of 15 µm was obtained.

The properties of the drawn films thus obtained were evaluated. Table 4 shows the results.

COMPARATIVE EXAMPLE 8

The procedure of Example 6 was repeated except that M-1 was not used. As a result, a drawn film having a thickness of 15 µm was obtained.

The properties of the drawn films thus obtained were evaluated. Table 4 shows the results.

COMPARATIVE EXAMPLE 9

Montmorillonite was swollen in accordance with the method described in JP-A-2-105856 to thereby give a complex of ammonium 12-aminododecanoate ion with montmorillonite.

The polymerization and drawing procedures of Example 1 were repeated except that 180 g of this complex was used. The resin composition thus obtained contained 2.0% by weight of montmorillonite.

Then, the procedure of Example 1 was repeated and the properties of the drawn film thus obtained were evaluated. Table 4 shows the results.

TABLE 4

| Item | Ex. 6 | Comp. Ex. 7 | Comp. Ex. 8 | Comp. Ex. 9 |
|---|---|---|---|---|
| Polyamide | Nylon 66 | Nyln 66 | Nylon 66 | Nylon 6 |
| Component blended | M-1 | SWN | — | 1) |
| Amount of component blended (wt. %) | 0.1 | 2.0 | — | 2 |
| Tensile strength MD/TD (kg/mm$^2$) | 23/25 | 21/25 | 21/22 | 20/23 |
| Breaking extension (%) | 100/96 | 90/70 | 100/95 | 45/49 |
| Oxygen permeability (cc/m$^2$ · 24 hr) | 35 | 25 | 58 | 28 |
| Dry heat shrinkage percentage MD/TD(%) | 0.7/0.6 | 1.3/1.0 | 1.4/1.2 | 0.4/0.4 |
| Hz (%) | 4.1 | 3.5 | 3.6 | 4.2 |
| Piercing pinhole resistance (kg/mm) | 71 | 63 | 61 | 76 |
| Static coefficient of friction | 0.50 | 0.98 | 0.74 | 0.52 |
| Roughness: SRa (μm) | 0.016 | 0.001 | 0.013 | 0.015 |
| SRz (μm) | 0.54 | 0.26 | 0.89 | 0.54 |
| After retort treatment: Shrinkage MD/TD (%) | 2.3/2.3 | 3.3/3.2 | 3.2/3.3 | 1.0/1.3 |
| Tensile strength MD/TD (kg/mm$^2$) | 21/20 | 9/15 | 8/13 | 16/15 |
| Breaking extension MD/TD (%) | 98/83 | 21/39 | 10/38 | 45/42 |

1) Montmorillonite

COMPARATIVE EXAMPLE 10

The procedures of Examples 1 to 5 were repeated except that the step of soaking the undrawn film in a warm water tank (50° C.) was omitted. As a result, each film was broken and thus could not produced stably. The moisture content of the undrawn film was 0.08% by weight.

The present invention provides a film, which is excellent in, particularly, piercing pinhole resistance and mechanical properties and heat dimensional stability after a retort treatment.

While the invention has been described in detail and with reference to specific examples thereof, it will be apparent to one skilled in the art that various changes and modifications can be made therein without departing from the spirit and scope thereof.

What is claimed is:

1. A polyamide film having been drawn at a draw ratio of 2 or more in at least one direction, which comprises a polyamide resin composition comprising from 90 to 99.99% by weight of a polyamide and from 10 to 0.01% by weight of a fluoromica-based mineral with swelling characteristics, said weight percentages being based on the total amount of the polyamide and the fluoromica-based mineral.

2. A polyamide film as claimed in claim 1, wherein said polyamide resin composition is obtainable by polymerizing a monomer capable of forming the polyamide in the presence of a fluoromica-based mineral with swelling characteristics.

3. A polyamide film as claimed in claim 1 or 2, which has a dry heat shrinkage percentage at 160° C. for 5 minutes of less than 1.3%.

4. A polyamide film as claimed in claim 1 or 2, wherein said polyamide is nylon 6.

5. A polyamide film as claimed in claims 1 or 2, wherein the fluoromica-based mineral has a structure represented by the following general formula (I):

$$\alpha(MF)\cdot\beta(aMgF_2\cdot bMgO)\cdot\gamma SiO_2 \quad (I)$$

wherein M represents sodium or lithium; $\alpha$, $\beta$, $\gamma$, a and b each represent a coefficient provided that $0.1 \leq \alpha \leq 2$, $2 \leq \beta \leq 3.5$, $3 \leq \gamma \leq 4$, $0 \leq a \leq 1$, $0 \leq b \leq 1$ and $a+b=1$.

6. A polyamide film as claimed in claim 5, wherein the fluoromica-based mineral has a basal spacing along the C-axis which is of from 9 to 20 Å.

7. A process for producing a polyamide film, which comprises the steps of:

regulating the moisture content of an undrawn film which comprises a polyamide resin composition comprising from 90 to 99.99% by weight of a polyamide and from 10 to 0.01% by weight of a fluoromica-based mineral with swelling characteristics to less than 1.3% by weight, and drawing the film by a tubular method or a successive biaxial drawing method, said weight percentages being based on the total amount of the polyamide and the fluoromica-based mineral.

8. A process for producing a polyamide film, which comprises the steps of:

regulating the moisture content of an undrawn film which comprises a polyamide resin composition comprising from 90 to 99.99% by weight of a polyamide and from 10 to 0.01% by weight f a fluoromica-based mineral with swelling characteristics to the range of from 1.3% to 10 by weight, and drawing the film by a successive biaxial method, said weight percentages being based on the total amount of the polyamide and the fluoromica-based mineral.

* * * * *